A. C. EASTWOOD.

ELECTRIC CONTROLLER.

APPLICATION FILED JULY 11, 1913.

Reissued Feb. 29, 1916.

14,076.

4 SHEETS—SHEET 1.

WITNESSES:

Elva Stanich.

R. F. Dilworth

INVENTOR

Arthur C. Eastwood

BY

F. N. Barber

ATTORNEY

A. C. EASTWOOD.

ELECTRIC CONTROLLER.

APPLICATION FILED JULY 11, 1913.

Reissued Feb. 29, 1916. 14,076.

4 SHEETS—SHEET 2.

WITNESSES:

Elva Staniek

R. F. Dilworth

INVENTOR

Arthur C. Eastwood

BY

F. N. Barber

ATTORNEY

A. C. EASTWOOD.

ELECTRIC CONTROLLER.

APPLICATION FILED JULY 11, 1913.

Reissued Feb. 29, 1916.

14,076.

4 SHEETS—SHEET 3.

WITNESSES:

Elva Staniek

R. F. Wilcott

INVENTOR

Arthur C. Eastwood

BY

F. N. Barber

ATTORNEY

A. C. EASTWOOD.

ELECTRIC CONTROLLER.

APPLICATION FILED JULY 11, 1913.

Reissued Feb. 29, 1916.

14,076.

4 SHEETS—SHEET 4.

WITNESSES:

Elva Staniel

R. F. Wilworth

INVENTOR

Arthur C. Eastwood

BY

F. N. Barber

ATTORNEY

UNITED STATES PATENT OFFICE.

ARTHUR C. EASTWOOD, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER 14,076. Specification of Reissued Letters Patent. Reissued Feb. 29, 1916.

Original No. 1,013,754, dated January 2, 1912, Serial No. 533,301. Application for reissue filed July 11, 1913. Serial No. 773,593.

*To all whom it may concern:*

Be it known that I, ARTHUR C. EASTWOOD, a citizen of the United States, residing at Cleveland, in the county of Cuyahoga and State of Ohio, have invented new and useful Improvements in Electric Controllers, of which the following is a specification.

My invention relates to improvements in electric controllers in which the various connections for controlling the speed of the motor are effected by individual magnetically-operated switches.

One of the objects of my invention is to obviate the necessity of winding the coils of the switch-operating magnets with such fine wire as has been the practice.

Another object is to provide means for electrically interlocking the switches which control the speed of the motor without the use of the usual auxiliary contacts.

Other objects are to simplify and cheapen greatly the construction of the type of controller to which it relates; to render the connections and operation of the controller more readily understood by those intrusted with its care, and to make it much more reliable and satisfactory in service.

Figure 1:
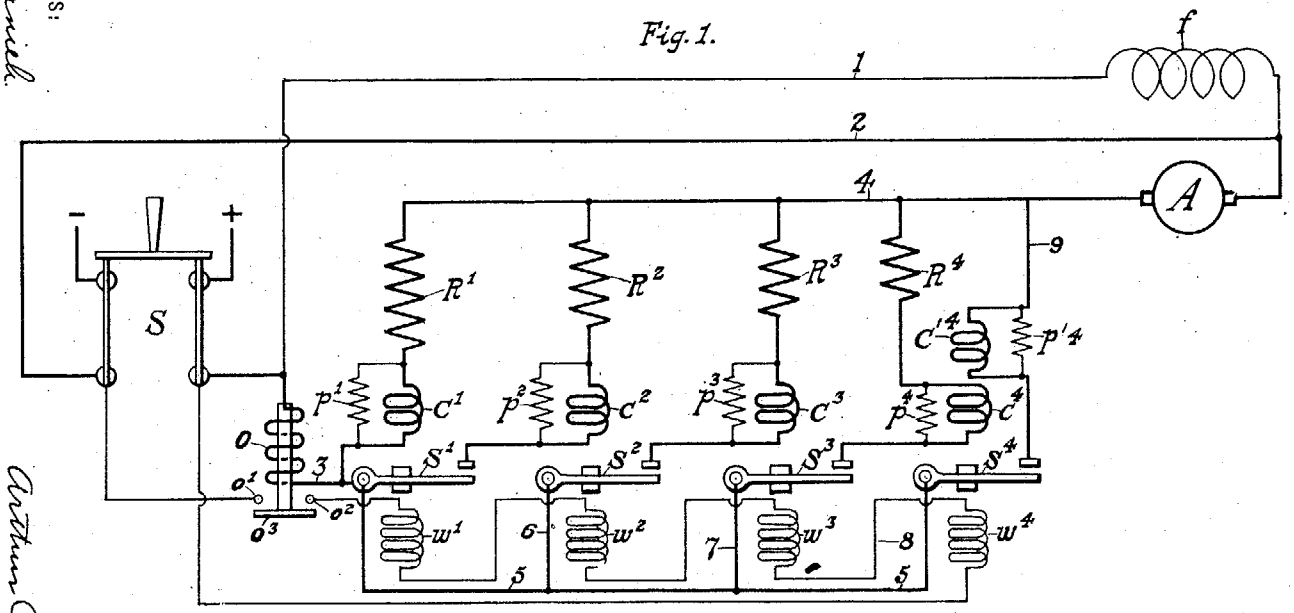
Figure 2:
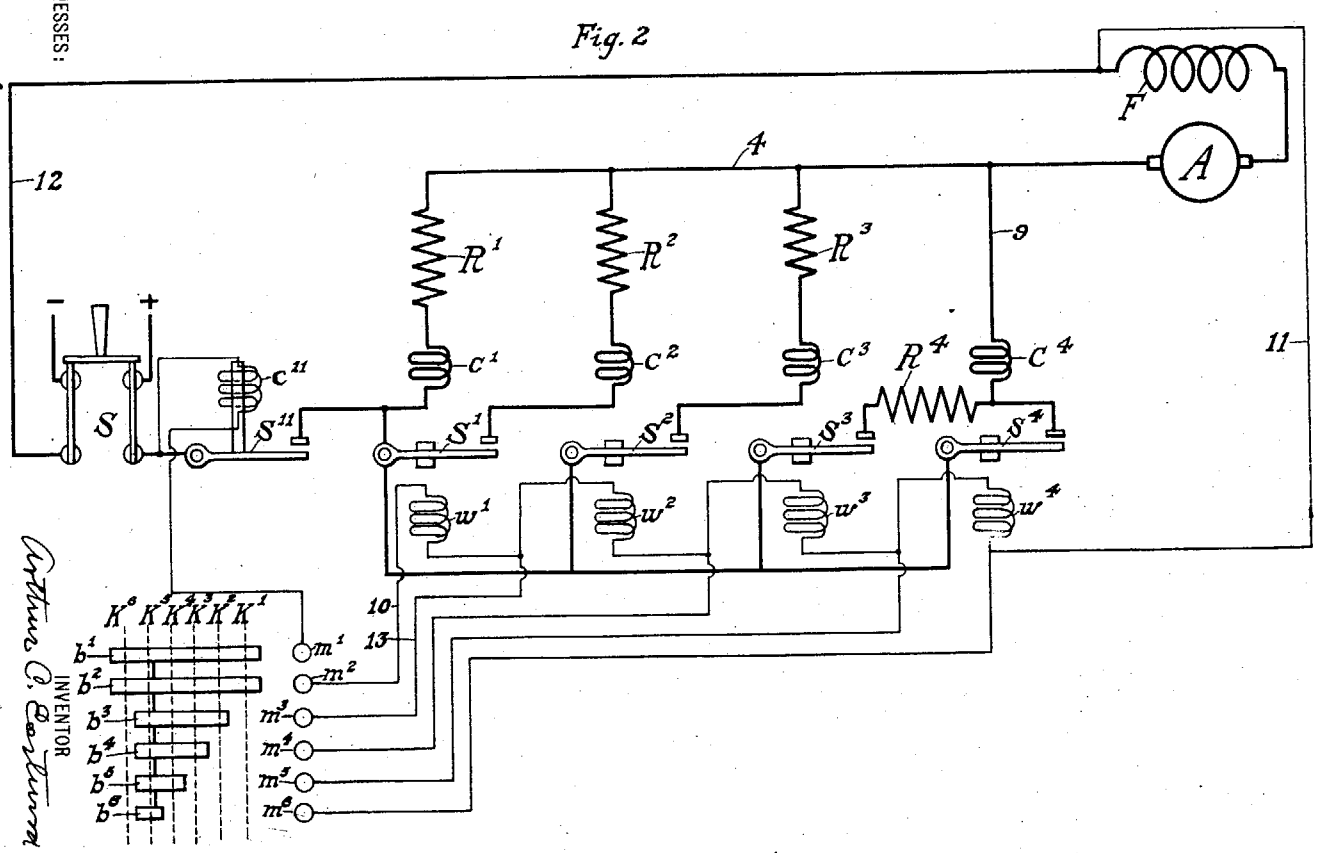
Figure 3:
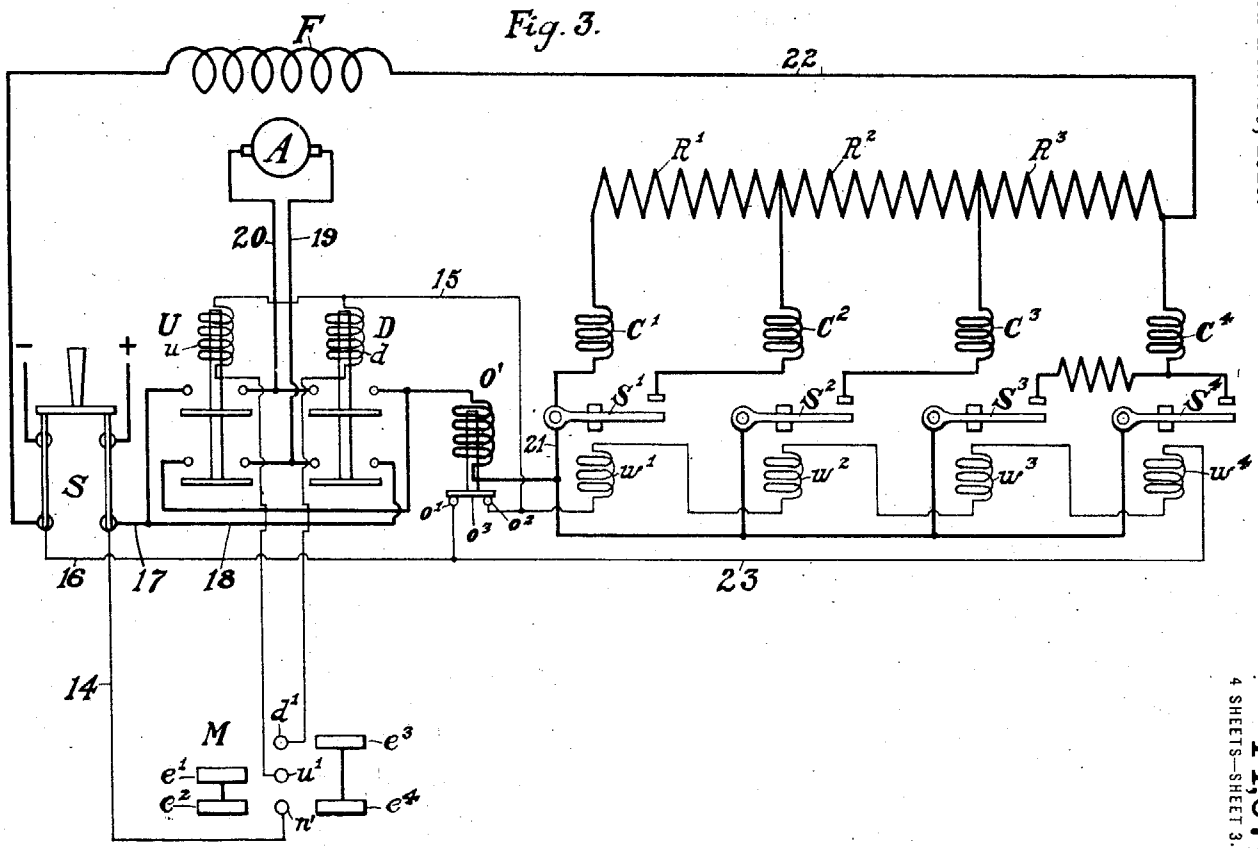
Figure 4:
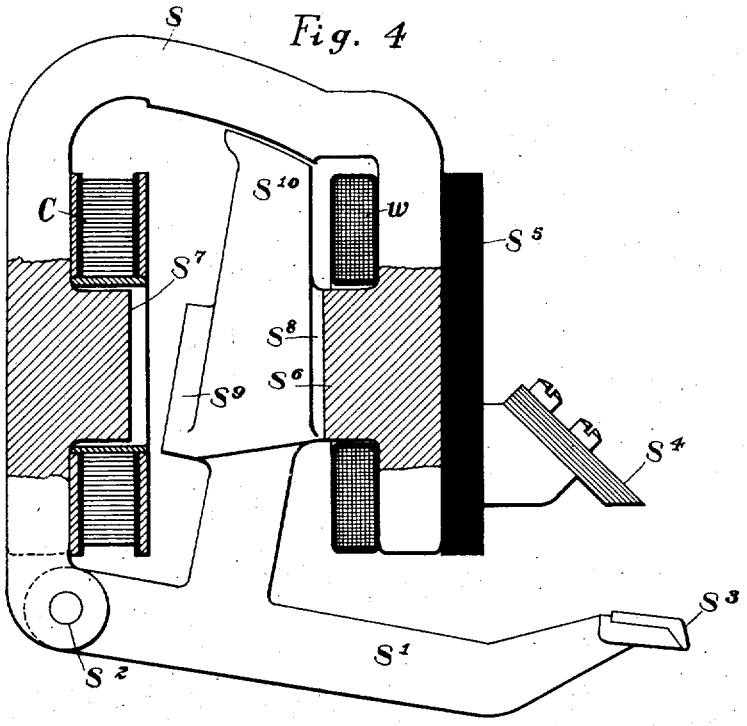

Referring to the accompanying drawings, Figures 1, 2 and 3 are diagrammatic views, showing three of the many forms which my invention may assume. Fig. 4 is an elevation partly in section showing one of the magnetically-operated switches referred to herein.

Referring now to Fig. 1, S is the main switch for connecting the motor and controller to the two sides of a supply circuit; A is the armature of the motor; and $f$ is the shunt-field winding which is connected across the positive and negative sides of the switch S; R′, $R^2$, $R^3$, and $R^4$ are sections of resistance connected in multiple for controlling the flow of current to the motor. The sections R′ to $R^4$ of resistance are controlled, respectively, by the switches S′, $S^2$, $S^3$, and $S^4$, these switches having the operating or closing windings C′, $C^2$, $C^3$, and $C^4$, respectively, and the locking-out windings, $w'$, $w^2$, $w^3$ and $w^4$, respectively. I have also shown associated with the operating windings of the switches shunts designated, respectively, as $p'$, $p^2$, $p^3$, and $p^4$.

O is an acceleration relay which governs the time of closure of the successive switches. It will be seen that the locking out coils $w'$, $w^2$, $w^3$, and $w^4$ are connected in series, the circuit of this series passing through the contacts of the acceleration relay O. The relay is so adjusted that when a predetermined current passes through its winding which is in the motor circuit, it will raise its plunger so that its contact member $o^3$ will span the contacts $o'$ and $o^2$ thus closing the circuit through the locking-out coils $w'$ to $w^4$. Consequently, if the current taken by the motor is below the value for which the relay is adjusted, the locking-out coils will not be energized, and the switches will be free to close consecutively. If, however, during the process of starting the motor, the motor current exceeds the predetermined value, the locking-out coils will be energized, when the relay lifts its plunger, and further progressive closure of the switches will be arrested.

Assuming that the switch S is closed a circuit is made from the positive side of the switch S through the wire 1, the shunt-field winding $f$, and the wire 2 to the negative side of the switch S, thus energizing the shunt-field. At the same time a second circuit is established from the positive side of the switch S through the winding of the relay O, the wire 3, the operating winding C′ of the switch S′, the resistance section R′, the wire 4, the armature A, and the wire 2 to the negative side of the switch S. The circuit of the motor is complete with the resistance section R′, in series therewith, and the operating winding C′ of the resistance switch S′ is also in series with this circuit which may be designated as the controlled circuit. This circuit tends to cause the switch S′ to close, and it will close providing the current is not excessive. When switch S′ closes, a branch circuit is established from the positive side of the switch S through the winding of the relay O, the wire 3, the contacts of the switch S′, and the winding $C^2$ of the switch $S^2$, the resistance section $R^2$, the wire 4, the armature A, and the wire 2 to the negative side of the switch S, which branch circuit places the resistance $R^2$ in parallel with the resistance R′, the two resistances in parallel being in series with the armature A. If the current is excessive, that is, above a predetermined value, the relay O raises its plunger, closing the circuit of the locking-out coils, so that notwithstanding the fact that the winding $C^2$ of the switch $S^2$ is energized, the switch $S^2$ cannot close. When the current of the motor drops to the said predetermined value, the relay drops its plunger, causing the locking-out coils to be deënergized, whereupon the switch $S^2$ immediately closes. The switch $S^2$ in closing closes a circuit from the wire 5, through the wire 6, the operating winding $C^3$ of the switch $S^3$, and the resistance section $R^3$. The resistances R′, $R^2$, and $R^3$ are connected in parallel, the three resistances in parallel being in series with the armature A. In case the motor current is above a predetermined value, the relay O closes its contacts, causing the locking coils to be energized, and the switch $S^3$ to remain open, as will be readily understood from the description herein relative to the action of the relay in connection with the locking coils and the switch $S^2$. When the motor current again drops to the said predetermined value, the switch $S^3$ closes and in closing closes a circuit from the wire 5, through the wire 7, the contacts of the switch $S^3$, the operating winding $C^4$ of the switch $S^4$, and the resistance section $R^4$ to the wire 4, thus placing the resistance sections R′, $R^2$, $R^3$, and $R^4$ in parallel. This leaves the operating winding $C^4$ of switch $S^4$ energized. In case the motor current is above a predetermined value, the relay O operates, as already described, to close the circuit of the locking coils and prevent the closing of the switch $S^4$. When the motor current falls to the predetermined value the switch $S^4$ closes, thus creating another circuit from the wire 5 directly through the contacts of switch $S^4$, the maintaining winding $C'^4$, and the wire 9 to the armature A of the motor, which circuit short-circuits all of the resistance, and permits the motor to operate at full speed. Since the path from the wire 5 through the contacts of the switch $S^4$, its maintaining winding $C'^4$, and the wire 9 is of very low resistance, practically no current passes through the resistance sections R′, $R^2$, $R^3$, and $R^4$, and the switch-operating windings C′, $C^2$, and $C^3$, associated therewith, and, therefore, these switches open and the circuit through the motor is then maintained entirely through the switch $S^4$.

When it is desired to stop the motor, the main circuit is opened at the switch S, which, of course, deënergizes the winding $C'^4$ of the switch $S^4$, causing this switch to open.

I have shown in this figure the shunts $p'$, $p^2$, $p^3$, and $p^4$ associated with the windings C′, $C^2$, $C^3$, and $C^4$, respectively, the purpose of these shunts being to adapt a given standard operating winding for use with motors varying in their ampere capacity, the variation in capacity being taken care of by the resistance of the shunt. Assuming, for instance, that the various operating coils C′ to $C^4$ are wound for a capacity of 20 amperes, they can be used without shunts on a motor which requires 20 amperes of current. The same coils, however, can be applied to a motor having a capacity of 40 amperes by making the resistance of the shunts such that one-half of the motor current will pass through the operating winding.

I have shown the switch $S^4$ provided with two windings marked $C^4$ and $C'^4$ respectively. The winding $C^4$ is energized by closure of the switch $S^3$, and may be termed the operating winding. The winding $C'^4$ is energized through the closure of the switch $S^4$, and may be termed a maintaining winding. These two windings have been introduced for the reason that, if the winding $C'^4$ were not provided, and the stationary terminal of switch $S^4$ were connected directly to the wire 9 and to the armature, the winding $C^4$ would be short-circuited when the switch closes, which would tend to cause the switch $S^4$ to immediately open.

Referring now to Fig. 2, S is the main switch for connecting the motor and the controller to a source of current; A, the armature of the motor; F, the series field winding; and R′, $R^2$, $R^3$, $R^4$, sections of resistance arranged to be connected in parallel, the parallel sections being included in series with the motor by the successive closure of the switches S″, S′, $S^2$ and $S^3$. The switch $S^4$ in closing closes a circuit through the wire 9, thus short-circuiting the resistance sections R′, $R^2$, $R^3$, and $R^4$.

The locking-out windings $w'$, $w^2$, $w^3$, and $w^4$ are associated with the series switches as in Fig. 1. These windings, however, in place of being all simultaneously controlled by a relay, as in Fig. 1, are arranged to be individually controlled by the contacts of the master switch M, which is illustrated as being of the drum type, having stationary contact fingers marked, respectively, $m'$ to $m^6$, and corresponding contact strips $b'$ to $b^6$, respectively, mounted upon a revoluble drum or barrel, which may be placed in any one of six positions indicated, respectively, by the dotted lines K′ to $K^6$.

$S''$ is a magnetically-operated switch which controls the main circuit to the motor.

Assuming that the switch S is closed, and that the master switch M is brought to the position corresponding to the line $K'$, a circuit is established as follows: from the positive side of the switch S through the winding $c''$ of the switch $S''$, the contact $m'$ of the master switch M, the contact strips $b'$ and $b^2$, the finger $m^2$, the wire 10, the locking windings $w'$, $w^2$, $w^3$, $w^4$ in series, the wire 11, and the wire 12 to the negative side of the switch S. This circuit energizes the winding $c''$ of the switch $S''$ and causes the latter to close, at the same time energizing the locking windings $w'$ to $w^4$.

The switch $S''$ in closing closes the main circuit through the motor as follows: from the positive side of the main switch through the contacts of the switch $S''$, the operating winding $c'$ of the switch $S'$, the resistance section $R'$, the wire 4, the armature A, the series field F, and the wire 12 to the negative side of the switch S. The circuit of the motor is complete to the resistance section $R'$ and the motor should start. Notwithstanding that this circuit includes the operating winding of the switch $S'$, the latter cannot close because it is held by the locking winding $w'$.

When it is desired to increase the speed of the motor, the master switch is moved to the position corresponding to the line $K^2$. The locking winding $w'$ is then deënergized or short-circuited, as will be seen by tracing the following circuits: from the positive side of the switch S through the winding $c''$, of switch $S''$, the contact finger $m'$ of the master controller, the contact strips $b$, $b^2$, and $b^3$ of the controller, the finger $m^3$, the wire 13, and the locking windings $w^2$, $w^3$ and $w^4$ in series to the negative main through the wires 11 and 12. Obviously, the locking winding $w'$ associated with the switch $S'$ is short-circuited, and the switch $S'$ may close.

It is evident that, when the master controller is moved to the position $K^3$, locking winding $w^2$ is short-circuited and switch $S^2$ may close. Likewise, switches $S^3$ and $S^4$ may be caused to close by correspondingly moving the master switch to the positions $K^4$ and $K^5$.

The switch $S'$ in closing closes the circuit through the operating winding $C^2$ of the switch $S^2$, while the switch $S^2$ in closing closes the circuit through the operating winding $C^3$ of the switch $S^3$, and the switch $S^3$ in closing closes the circuit through the operating winding $C^4$ of the switch $S^4$. Switch $S^4$ in closing includes its own winding $C^4$ in the motor circuit through the wire 9. I have shown this connection of the winding of the switch $S^4$ as an alternate to the double winding of that switch shown in Fig. 1. Position $K^6$ on the master switch inserts all the locking coils in series with the coil $c''$ preventing overheating.

When the master switch M is moved to the off position, the circuit through the winding of the magnetic switch $S''$ is opened at the contact fingers $m'$ and $m^2$, thus causing the switch $S''$ to open, cutting off the current from the motor, and likewise from the winding $C^4$ of the switch $S^4$, causing this switch to open.

Referring now to Fig. 3, S is a main switch, as before, while A is the armature; and F, the series field winding of the motor. $R'$, $R^2$, and $R^3$ are sections of resistance which differ in arrangement from the resistances shown in Figs. 1 and 2 in that the sections of resistance are connected in series when the motor is started. D and U constitute reversing switches, operated, respectively, by electro-magnets having windings $d$ and $u$. The reversing switch D is operated to give one direction of rotation of the armature of the motor, and the reversing switch U is operated to give the reverse motion in the well known manner.

I have shown a relay $O'$ responsive to the motor current for governing the circuit of the locking-out windings $w'$, $w^2$, $w^3$, and $w^4$, as in Fig. 1.

M is a master switch which may be used for starting, stopping, and reversing the motor.

Assuming that the barrel of the master controller is moved toward the left so as to bring the contact fingers $d'$ and $n'$ into contact with the respective segments $e^3$ and $e^4$, a circuit will then be established as follows: from the positive side of the switch S to the wire 14, the contact finger $n'$, the contact strips $e^3$ and $e^4$, the contact finger $d'$, the winding $d$ of the reversing switch, the wire 15, the contacts $o'$, $o^2$ and $o^3$ of the acceleration-relay $O'$, and the wire 16 to the negative side of the switch S. This completes the circuit through the winding $d$, which causes the switch D to lift its plunger, which in turn completes the main motor-circuit as follows: from the positive side of the switch S through the wire 17, the wire 18, the lower contacts of the reversing switch D, the wire 19, the armature A, the wire 20, the upper contacts of the reversing switch D, the winding of relay $O'$, the wire 21, the winding $C'$ of the switch $S'$, the resistance sections $R'$, $R^2$, and $R^3$, the wire 22, and the series field F to the negative side of the switch S, thus completing the circuit through the motor.

The switch $S'$, when it closes, closes a circuit through the operating winding $C^2$ of the switch $S^2$, which in turn closes a circuit through the winding $C^3$ of the switch $S^3$, while the switch $S^3$ in closing closes a circuit through the winding $C^4$ of the switch $S^4$.

If an excessive motor current does not flow when the reversing switch D closes, the relay O′ will rest on its contacts, and all the locking coils $w'$, $w^2$, $w^3$, and $w^4$ are short-circuited. If, however, an excessive current should flow through the motor, the relay would raise its contacts and all of the locking coils would then be energized through the following circuit: from the positive side of the switch S, through the wire 14, the contact finger $n'$ of the master switch, the contact finger $d'$, the winding $d$ of the reversing switch D, the wire 15, the windings $w'$, $w^2$, $w^3$, and $w^4$ in series, the wire 23, and the wire 16 to the negative side of the switch S. The closure of the switch S′ is prevented until the motor current has been reduced by the speeding up of the motor, at which time the relay O′ will drop its plunger, thus short-circuiting the locking-windings, and permitting the switch S′ to close. If the closure of this switch produces an excessive current the plunger of the relay will then rise, again energizing the locking windings and preventing closure of the switch $S^2$. The closure of the switches $S^3$ and $S^4$ is governed in a similar manner.

When it is desired to stop the motor, the master switch is moved to the off position, which deënergizes the winding $d$ of the reversing switch D, causing the same to open, and thus open the circuit through the motor and through the operating winding $C^4$ of the switch $S^4$, which causes the switch $S^4$ also to open.

When it is desired to start the motor in the reverse direction, the master switch is moved to the right, bringing the contact fingers $n'$ and $u'$ into contact with the corresponding strips $e'$ and $e^2$. This closes a circuit which energizes the winding $u$, causing the reversing switch U to close. This reversing switch is so connected as to reverse the direction of current flow through the armature of the motor, causing the armature to reverse its direction of rotation in the well known and obvious way. The subsequent closure of the switches S′ to $S^4$ is automatically governed, as previously described.

In Figs. 1, 2 and 3, the resistance controlling switches S′ to $S^4$ are held closed by all or a portion of the motor current, and these switches may readily be so proportioned that they will remain closed until the current through their windings has been reduced to almost zero.

In ordinary operation the opening of the motor circuit in the embodiment shown in Fig. 1 takes place at the contacts of the switch S, while in Fig. 2 the circuit is normally opened at the contacts of the magnetic switch S″, and in Fig. 3, at the contacts of one or the other of the reversing switches D or U. It is evident, therefore, that substantially all of the arcing which takes place in the operation of these controllers occurs at the contacts of the switches at which the circuit of the motor is normally opened, and that under no conditions will there be any arcing of a serious nature at the contacts of the resistance controlling switches. Therefore, in addition to the elimination of auxiliary circuit contacts in connection with the several resistance switches, my invention also provides means whereby the necessity of blow-out magnets and elaborate arc-breaking arrangements is obviated in connection with the resistance switches.

In Fig. 4, $s$ is the frame of one of the switches S′ to $S^4$ and is made of magnetic material. It carries two opposite bosses $s^6$ and $s^7$ which form cores for the locking winding $w$ and the actuating winding C, respectively. $s'$ is the movable contact arm of the switch pivoted to the frame at $s^2$ and carrying at its free extremity a contact member $s^3$ adapted to coöperate with the stationary contact brush $s^4$ which is mounted upon a suitable insulating plate $s^5$. The contact arm is provided with an upwardly extending member which carries the bosses $s^8$ and $s^9$ adapted to coöperate with the cores $s^6$ and $s^7$. The upper end of the extension is provided with a face $s^{10}$ which is an arc drawn from the pivot $s^2$ curved so as to maintain a uniform and small air gap with the frame as the arm moves about its pivot $s^2$, the frame adjacent to the face $s^{10}$ having its face next to the face $s^{10}$ concentric with the face $s^{10}$. With the switch in its open position as shown, the magnetic circuit is practically completed through the core $s^6$, the extension of the arms $s^{10}$, and the frame of the switch. When the switch is closed, the magnetic circuit is similarly completed through the core $s^7$, the extension $s^{10}$ and the frame of the switch.

I claim—

1. In an electric controller, a controlled circuit, a series of magnetically-operated switches, each having an operating winding adapted to be connected in the controlled circuit, and each having a locking winding arranged to prevent the operation of the switch with which it is associated.

2. In an electric controller, a controlled circuit, a series of magnetically-operated switches, the winding of each switch arranged to be included in the controlled circuit by the closing of a preceding switch of the said series, and a locking winding associated with each switch, and arranged to prevent the closure of the switch with which it is associated.

3. In an electric controller, a controlled circuit, a series of magnetically-operated switches, the winding of each switch arranged to be included in the controlled circuit by the closing of a preceding switch of the said series, a locking winding arranged to prevent each of said switches from closing, and a switch mechanism arranged to control each locking winding.

4. In an electric controller, a controlled circuit, a series of magnetically-operated switches, each of said switches having its operating winding arranged to be included in the controlled circuit by the closing of a preceding switch, a locking winding arranged to prevent the closing of the said switches, and a switch mechanism arranged to deënergize each locking winding.

5. In an electric controller, a controlled circuit, a series of magnetically-operated switches, each of said switches having its operating winding arranged to be included in the controlled circuit by the closing of a preceding switch, a locking winding arranged to prevent the closing of the said switches, and a master-switch to successively deënergize the said locking windings.

6. In an electric controller, a series of electro-magnetically operated switches, each of said switches having an operating winding adapted when energized to cause the closing of said switch, means for successively energizing said operating windings, a locking winding adapted when energized to prevent each switch from closing, and a switch to deënergize the said locking windings.

7. In a controller for electric motors, a motor circuit, a resistance, a pilot switch for closing the circuit through the said motor and the said resistance, a series of switches for controlling the amount of the said resistance in the motor circuit, each of said switches except the first having an operating winding included in the circuit closed at the main contacts of the switch which precedes it in operation, a locking winding for each switch normally energized for preventing the operation of the said switch, and a master switch for successively deënergizing the said locking windings.

8. In a controller for electric motors, a motor circuit, a resistance, a pilot switch for closing the circuit through the said motor and the said resistance, a series of switches for controlling the amount of the said resistance in the motor circuit, each of the switches of said series having an operating winding included in the circuit closed at the main contacts of the switch which precedes it in operation, and a locking winding for each switch of said series arranged to prevent the closing of the said switch until the effect of said locking winding is neutralized or removed.

9. In an electric controller, a controlled circuit, a series of magnetically-operated switches arranged to close in a predetermined order, each of said switches having an actuating winding included in the controlled circuit by the closure of the preceding switch; the last of the said switches having contacts for short-circuiting the actuating windings of the preceding switches.

10. In an electric controller, a controlled circuit, a series of magnetically-operated switches adapted to close in a predetermined order, each of said switches having contacts and an actuating winding adapted to be connected in the controlled circuit, the actuating winding of each switch being included in the controlled circuit by the closure of the switch which precedes it in closure, and contacts on the last of said switches to close which serve to short-circuit the actuating windings of the preceding switches when the said last switch closes.

11. In a controller for electric motors, a motor circuit, a resistance for the motor circuit, a series of switches having contacts for controlling successive sections of the said resistance, each of the said switches having an actuating winding included in the motor circuit by the closure of the switch which precedes it in operation, the contacts of the last of said switches to close being connected to short-circuit all of said resistance and also to short-circuit the actuating windings of the preceding resistance-controlling switches when said last switch is closed.

12. In a control system, a controlled circuit, a switch therefor, a winding for the switch energized by the current in the controlled circuit, a second switch for the said circuit, a winding therefor energized by the current in the said circuit, and connections whereby the first switch in closing energizes the winding of the second switch, and the second switch in closing causes the first switch to open.

13. In a control system, a controlled circuit, resistances therefor, switches for controlling the resistances, actuating windings for the switches energized by current in the controlled circuit, main contacts for connecting the resistances and the actuating winding of one of said switches in the said circuit, and connections whereby one switch of the series in closing energizes the winding of the next switch and said next switch in closing deënergizes the winding of said preceding switch.

14. In an electric controller, a controlled circuit, a series of magnetically-operated switches arranged to close in a predetermined order, each of said switches having an actuating winding included in the controlled circuit by closure of the preceding switch in the series, and each switch, when actuated, closing a circuit in shunt to a circuit closed by the switch which precedes it in operation.

15. In a controller for electric motors, a motor circuit, a resistance in the motor circuit, a series of switches for shunting successive sections of said resistance, each of the said switches having an actuating winding included in the motor circuit by the closure of the switch which precedes it in operation and each switch, when actuated, closing a circuit in shunt to a circuit including the switch which precedes it in operation and a section of said resistance.

Signed at Cleveland, Ohio, this 9th day of July A. D. 1913.

ARTHUR C. EASTWOOD.

Witnesses:

GEORGE S. PARKER,

H. M. DIEMER.